United States Patent [19]

Allison

[11] Patent Number: 5,433,571
[45] Date of Patent: Jul. 18, 1995

[54] BUTTON FASTENER FOR SECURING HEADLINER

[76] Inventor: Roger Allison, 4517 S. Peoria, Apt. 3, Tulsa, Okla. 74105

[21] Appl. No.: 194,993

[22] Filed: Feb. 14, 1994

[51] Int. Cl.⁶ .................. F16B 19/00; F16B 21/18
[52] U.S. Cl. ...................... 411/508; 411/373; 411/530; 411/913
[58] Field of Search ............ 411/341, 342, 450, 473, 411/480, 514, 530, 373, 508, 913

[56] References Cited

U.S. PATENT DOCUMENTS

| | | |
|---|---|---|
| 642,236 | 1/1900 | Larimer . |
| 679,823 | 8/1901 | Bailey .................. 411/480 |
| 772,280 | 10/1904 | Hyde, Jr. .............. 411/473 |
| 919,925 | 4/1909 | McWhorter ........... 411/514 X |
| 1,903,129 | 3/1933 | Peterson ............... 411/530 |
| 1,980,758 | 11/1934 | Komorous ............. 411/373 X |
| 2,109,576 | 3/1938 | Place ................... 411/530 |
| 2,133,785 | 10/1938 | Murphy ................ 411/373 X |
| 2,389,635 | 11/1945 | Place ................... 411/530 |
| 2,401,976 | 6/1946 | Simpson ............... 411/514 |
| 2,745,308 | 5/1956 | Gisondi . |
| 3,208,793 | 9/1965 | Copeland . |
| 3,842,709 | 10/1974 | Fuqua . |
| 4,352,522 | 10/1982 | Miller . |
| 4,971,388 | 11/1990 | Knaggs . |
| 5,186,517 | 2/1993 | Gilmore et al. . |

*Primary Examiner*—Neill R. Wilson
*Attorney, Agent, or Firm*—William S. Dorman

[57] ABSTRACT

A fastening device is provided to secure a sagging headliner to the interior roof portion of a motor vehicle. The device consists essentially of an upholstery type button which has been modified by attaching thereto a V-shaped member made from spring steel wire. The device is installed in the ceiling of the vehicle by squeezing the two prongs of the V-shaped member into a sharp point, and then pushing the point through the headliner and into a cardboard backing. When the button has been fully pushed in, the prongs of the V-shaped member will spread apart under the force of the flexed steel, and thereby hold the button, and the headliner, up against the roof of the car.

4 Claims, 2 Drawing Sheets

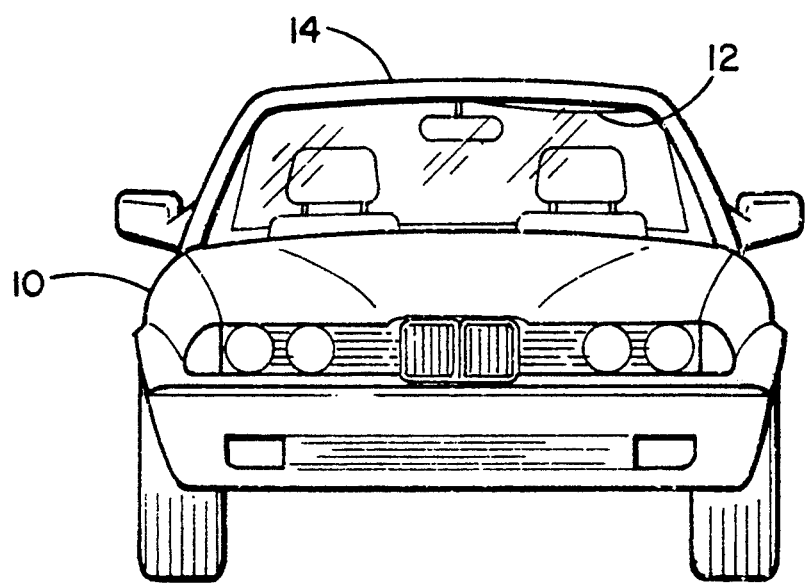
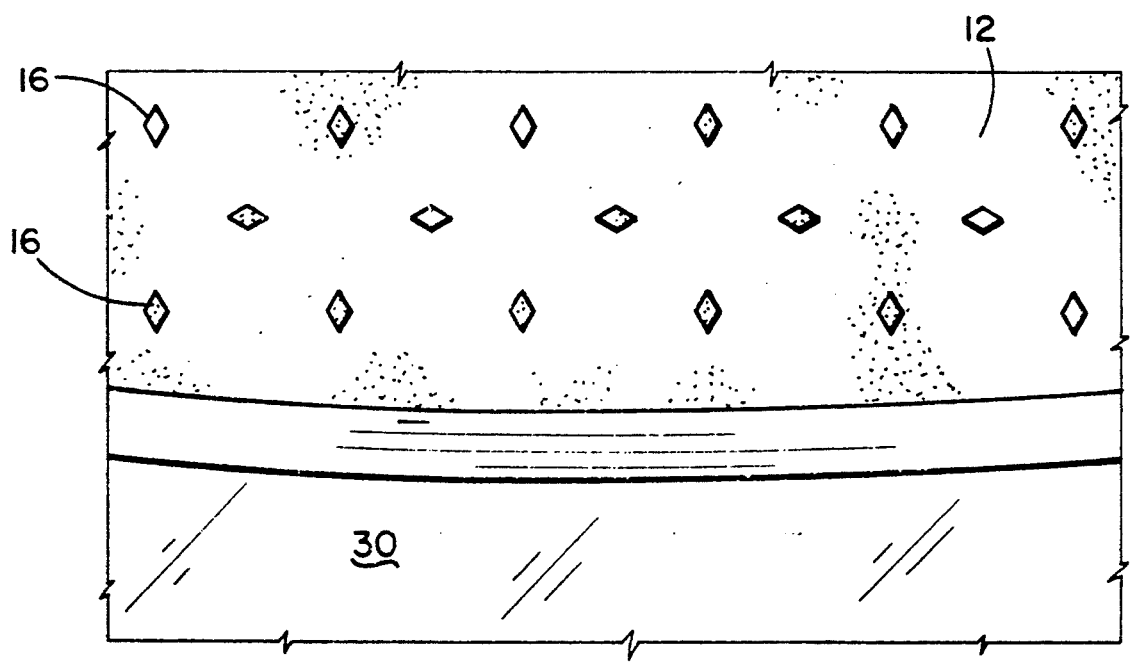
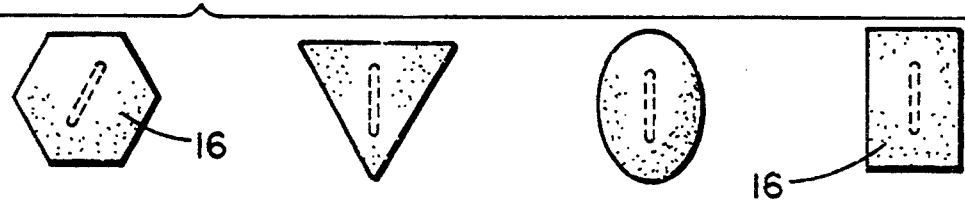
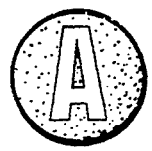
Fig. 1 Fig. 2 Fig. 3

BUTTON FASTENER FOR SECURING HEADLINER

FIELD OF THE INVENTION

The present invention relates to fabric fastening devices, and more particularly to a button fastening device for repairing a sagging automobile headliner.

THE PRIOR ART

An automobile "headliner" refers to the piece of material attached to the interior roof and side rear portions of an automobile. A headliner serves as a cosmetic to render the interior compartment of an automobile (or any other motor vehicle) aesthetically pleasing to the eye, as opposed to leaving the bare metal of the car's roof in full view. Typically, the headliner consists of a cloth, nylon or vinyl sheet of material which is secured by an adhesive to a cardboard liner. In some instances, a thin layer of foam is placed between the cardboard liner and the headliner sheet of material. As a car ages, it is not uncommon for a headliner to deteriorate to the point that it separates from the cardboard liner and sag into the interior compartment of the vehicle. In addition to giving the interior compartment an unsightly appearance, a sagging headliner can also be a safety hazard. For instance, if the headliner droops down too far, the driver's field of vision may be obstructed, or, if the headliner sags down far enough to touch the driver's head, the driver may become distracted—in either case, the potential for an injurious accident is heightened.

One way to solve the problem of a sagging headliner is to simply purchase a new headliner. However, the high cost in terms of time, effort and money, of installing a new headliner renders this option undesirable. Accordingly, the present invention was conceived in an effort to discover a simple and inexpensive way to repair an existing headliner.

The following references represent the results of a preliminary search conducted in the U.S. Patent Office for such a way to repair an existing headliner:

| 643,236 | 3,842,709 | 4,971,388 |
|---|---|---|
| 2,745,308 | 4,352,522 | 5,186,517 |
| 3,208,793 | | |

Larimer U.S. Pat. No. 643,236 discloses a clasp for flexible fabrics; Gisondi U.S. Pat. No. 2,745,308 shows a sheet metal nail with spreading legs; Copeland U.S. Pat. No. 3,208,793 discloses a device and method of repairing a torn headliner; Fuqua U.S. Pat. No. 3,842,709 shows a push-in fastener adapted to be inserted into an aperture in a support panel; Miller U.S. Pat. No. 4,352,522 discloses an automobile headliner and method for making same; Knaggs U.S. Pat. No. 4,971,388 discloses a headliner support assembly for repairing a damaged headliner; and, Gilmore et al. U.S. Pat. No. 5,186,517 discloses a slotted mounting assembly for attaching a headliner or other component to an automobile.

However, none of the above-described references satisfy the present need in the same way or as efficiently as the present invention, as more fully described below.

SUMMARY OF THE INVENTION

The present invention is directed to a device that solves and satisfies the above-explained problem by providing a new approach to repairing a drooping headliner. In more particular, it has been discovered that a plurality of modified upholstery type buttons (hereinafter "headliner button" or "button") can be pushed through the sagging portion of a headliner and through its associated cardboard liner so that the button holds the headliner securely against the cardboard liner.

The button of the present invention comprises a button head, a back plate and a V-shaped member. The V-shaped member, fabricated from spring steel, is welded to the back plate such that the prongs of the V-shaped member extend divergingly outward from the back plate in a plane at right angles thereto. The back plate along with the attached V-shaped member is then snapped into the button head. A sharp point is then formed by compressing the prongs of the V-shaped member together, which sharp point is then pushed through the sagging headliner and into the cardboard liner. As the button is pushed into the cardboard liner, the energy stored in the flexed spring steel prongs of the V-shaped member cause the prongs to separate. When the button is pushed all the way in, the outward force on the spring steel prongs of the V-shaped member operate to hold the button, along with the headliner, firmly against the cardboard liner.

These and other features, aspects and advantages of the present invention will become evident from the following detailed description, appended claims, and accompanying drawings.

BRIEF DESCRIPTION OF THE DRAWINGS

FIG. 1 is a front elevation view of an automobile shown with a sagging headliner.

FIG. 2 is a bottom plan view taken from inside the car showing a plurality of installed buttons holding the headliner snugly against the cardboard liner in the region adjacent the upper forward end of the rear window.

FIG. 3 shows the button of the present invention in a number of different geometric shapes and configurations.

DETAILED DESCRIPTION OF THE PREFERRED EMBODIMENT

Figure 4:
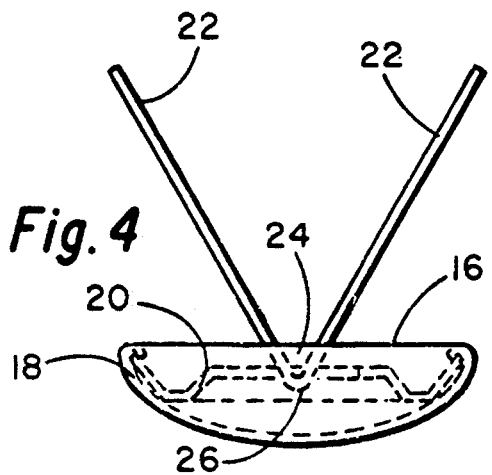
FIG. 4 is a side elevation of the button of the present invention with certain hidden parts being shown in dotted lines and showing the prongs in an open (non-flexed or resting) position.

Referring to the drawings in detail, wherein like numerals denote identical elements throughout the several views, there is shown in FIG. 1 a car 10 wherein its headliner 12 is sagging from the top 14 of the car 10. As best shown in FIGS. 7 and 8, the headliner 12 is drooping because it has become detached from its cardboard backing 15. The preferred embodiment of the present invention as illustrated in FIGS. 2–9, will be referred to generally as the headliner button 16.

Figure 5:
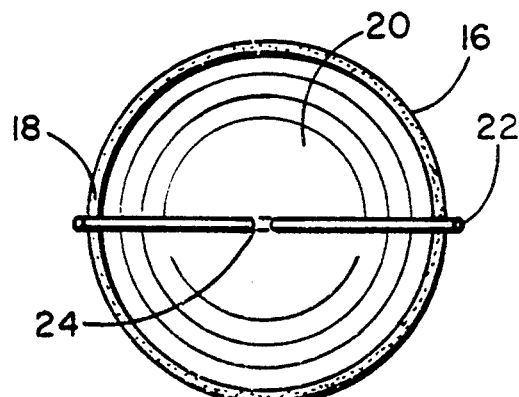
FIG. 5 is a top plan view of the button as shown in FIG. 4.

As shown in FIGS. 4 and 5, it can be seen that the button 16 consists of three components: a button head 18, a back plate 20, and a V-shaped member 22 which extends divergingly outward from the back plate 20 (and button 16) in a plane at right angles thereto. The button head 18 and the back plate 20 are similar to those found in any standard upholstery type button, except that the back plate 20 of the present invention is provided with two small holes, as at 24, through which the two prongs of the V-shaped member 22 are received. The V-shaped member 22 is fabricated from a piece of 3/64" diameter spring steel wire which, when straight (i.e., before the bend is applied) is approximately 1⅜" (inches) in length. After a bend is placed in the spring steel wire thereby giving the member 22 its "V" shape, the two prongs of the V-shaped member 22 are inserted through the holes at 24 until the bend 26 of the V-shaped member 22 is resting snugly against the back plate 20. The bend 26 of the V-shaped member 22 is then securely attached, as by MIG welding, to the back plate 20. The prongs of the V-shaped member 22 extend divergingly outward from the back plate 20 at an angle of approximately 60°, and the tips of the prongs are about ⅜ inches above the back plate 20. The button is completely assembled and ready for installation when the back plate 20 with the attached V-shaped member 22 is snapped into the button head 18.

Figure 6:
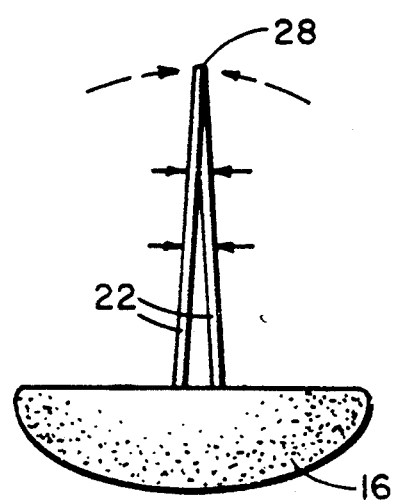
FIG. 6 is a side elevation of the button showing the prongs in a compressed or "squeezed" position.
Figure 7:
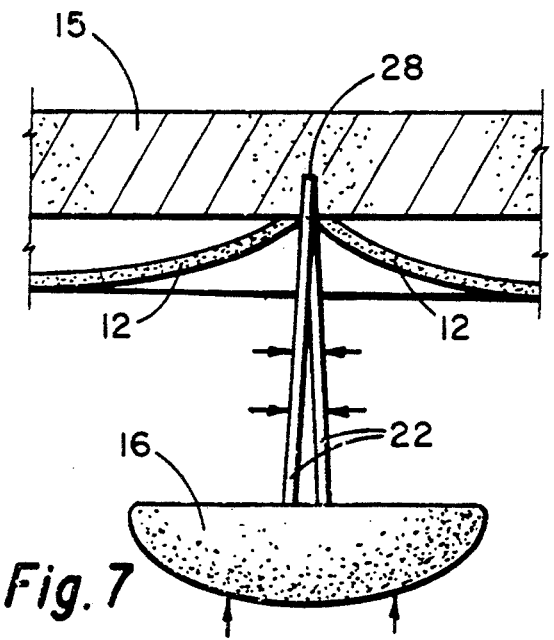
FIG. 7 includes the side elevation of the button as shown in FIG. 6, and also shows a cross section of the sagging headliner and cardboard liner with the point of the prongs passed through the headliner and partially inserted into the cardboard liner.
Figure 8:
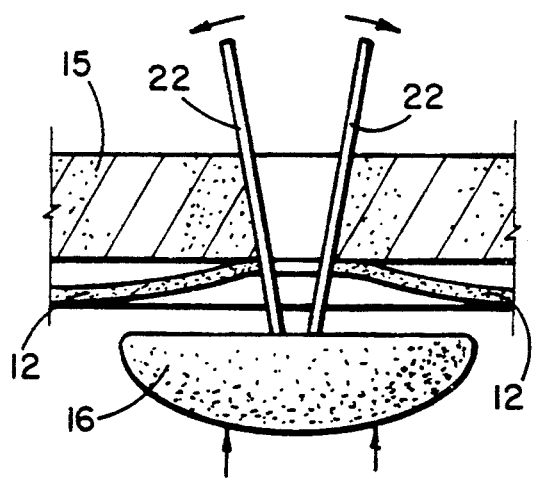
FIG. 8 is a side elevation of the button similar to FIG. 7, but, in this Figure, the prongs have now completely penetrated the cardboard liner, and the inherent force stored in the spring steel prongs is beginning to force the prongs apart.
Figure 9:
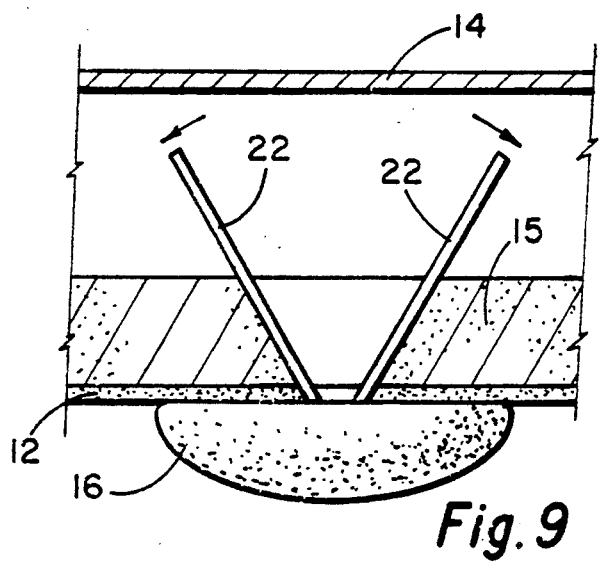
FIG. 9 is a side elevation showing the headliner, the cardboard liner, and the roof of the car, all in section, together with the button in the completely installed position.

The procedure for installing the button 16 is illustrated in FIGS. 6–9. As shown in FIG. 6, the first step is to squeeze the two prongs of the V-shaped member 22 together thereby forming a temporary sharp point 28. The next step, as shown in FIG. 7, is to insert the point 28 through the sagging headliner 12 and into the cardboard liner 15. As depicted in FIG. 8, it can be seen that as the button 16 is pushed upward into and through the cardboard liner 15, the residual force in the spring steel of the V-shaped member 22 will naturally cause the two prongs of the V-shaped member 22 to separate. Finally, as illustrated in FIG. 9, when the button 16 is pushed all the way in, the two prongs of the V-shaped member 22 will return to their original position (see also FIG. 4), and thereby operate to hold the button 16, along with the headliner 12, snugly against the cardboard liner 15.

It can also be seen from FIG. 9 that when the button 16 is fully installed, the two prongs of the V-shaped member 22 are short of touching the top 14 of the car.

FIG. 2 shows a plurality of buttons 16 holding the headliner 12 snugly in place. Although the buttons 16 can be inserted through the headliner 12 at any location from the rear window 30 forwardly, in FIG. 2 the buttons 16 are shown, purely for purposes of illustration, in the region adjacent the rear window 30.

As shown in FIG. 3, it can be seen that the button 16 may be provided in a variety of geometric shapes, or with a variety of letters, numerals, or fanciful symbols and the like.

Whereas, the present invention has been described in particular relation to the drawings attached hereto, other and further modifications, apart from those shown or suggested herein, may be made within the spirit and scope of this invention.

What is claimed is:

1. A headliner fastening device comprising:
   a button; and,
   a V-shaped member, said V-shaped member having two prongs, said V-shaped member being securely attached to said button such that said prongs extend divergingly outward from said button in a plane at right angles thereto, whereby two prongs can be squeezed together thereby forming a temporary sharp point such that the sharp point can be inserted through a headliner and into a backing material and whereby the two prongs will later return to their original positions to hold the button and headliner against the backing material.

2. A headliner fastening device as recited in claim 1 wherein said button further comprises:
   a back plate, said back plate being the portion of said button to which said V-shaped member is attached; and,
   a button head, said button head and said back plate being provided with corresponding snapping means,
   whereby said back plate and said button head are snapped together.

3. A headliner fastening device as recited in claim 1 wherein said V-shaped member is fabricated from a piece of spring steel wire.

4. A headliner fastening device as recited in claim 3 wherein the dimensions of said piece of spring steel wire, prior to bending, are as follows: 3/64 inch diameter and 1⅜ inches in length.

* * * * *